United States Patent
Mistry

(10) Patent No.: US 9,605,376 B2
(45) Date of Patent: Mar. 28, 2017

(54) TREATING MATERIALS WITH COMBINED ENERGY SOURCES

(71) Applicant: Pravin Mistry, Dearborn, MI (US)

(72) Inventor: Pravin Mistry, Dearborn, MI (US)

(73) Assignee: MTIX Ltd., West Yorkshire (GB)

( * ) Notice: Subject to any disclaimer, the term of this patent is extended or adjusted under 35 U.S.C. 154(b) by 578 days.

(21) Appl. No.: 14/138,109

(22) Filed: Dec. 22, 2013

(65) Prior Publication Data

US 2014/0377476 A1 Dec. 25, 2014

Related U.S. Application Data

(63) Continuation-in-part of application No. 13/536,257, filed on Jun. 28, 2012, now Pat. No. 9,309,619.
(Continued)

(51) Int. Cl.
| | |
|---|---|
| *B23K 10/00* | (2006.01) |
| *D06M 10/02* | (2006.01) |
| *D06M 10/00* | (2006.01) |

(52) U.S. Cl.
CPC ........ *D06M 10/025* (2013.01); *D06M 10/005* (2013.01)

(58) Field of Classification Search
CPC .............. D06M 10/025; D06M 10/005; B23K 26/123; H05H 2001/481; H05H 2001/485; H05H 1/42; H05H 1/48
(Continued)

(56) References Cited

U.S. PATENT DOCUMENTS

| 3,466,717 A | 9/1969 | Kuroda |
|---|---|---|
| 3,959,104 A | 5/1976 | Fales |
| (Continued) | | |

FOREIGN PATENT DOCUMENTS

| CN | 101 768714 A | 7/2010 |
|---|---|---|
| CN | 101 823 043 A | 9/2010 |
| (Continued) | | |

OTHER PUBLICATIONS

AST Products Inc., Plasma Applications, © 2012, 3 pages.
(Continued)

*Primary Examiner* — Mark Paschall
(74) *Attorney, Agent, or Firm* — Gerald E. Linden

(57) ABSTRACT

Material treatment is effected in a treatment region by at least two energy sources, such as (i) an atmospheric pressure (AP) plasma and (ii) an ultraviolet (UV) laser directed into the plasma and optionally onto the material being treated. During processing, the material being treated may remain substantially at room temperature. Precursor materials may be dispensed before, and finishing material may be dispensed after treatment. Precursors may be combined in the plasma, allowing for in situ synthesis and dry treatment of the material. Electrodes (e1, e2) for generating the plasma may comprise two spaced-apart rollers which, when rotating, advance the material through a treatment region. Nip rollers adjacent the electrode rollers define a semi-airtight cavity, and may have a metallic outer layer. Loose fibers and fragile membranes may be supported on a carrier membrane, which may be doped. Individual fibers may be processed. Electrostatic deposition may be performed. Topographical changes may be effected. Various laser configurations and parameters are disclosed.

25 Claims, 9 Drawing Sheets

Related U.S. Application Data

(60) Provisional application No. 61/745,765, filed on Dec. 25, 2012, provisional application No. 61/501,874, filed on Jun. 28, 2011.

(58) Field of Classification Search
USPC ............ 219/121.59, 121.52, 121.48, 121.84, 219/121.85, 121.6
See application file for complete search history.

(56) References Cited

U.S. PATENT DOCUMENTS

| | | | | |
|---|---|---|---|---|
| 4,689,467 | A * | 8/1987 | Inoue | B23K 10/00 219/121.6 |
| 5,413,814 | A | 5/1995 | Bowen et al. | |
| 5,554,415 | A | 9/1996 | Turchan et al. | |
| 5,804,263 | A | 9/1998 | Goldberg et al. | |
| 6,370,165 | B1 * | 4/2002 | Badzian | C23C 16/483 372/49.01 |
| 6,489,585 | B1 * | 12/2002 | Nakamura | H01J 37/32009 219/121.48 |
| 7,315,009 | B2 * | 1/2008 | Fujimoto | B23K 9/0026 219/121.11 |
| 7,642,533 | B2 * | 1/2010 | Partio | B82Y 10/00 250/504 R |
| 9,255,330 | B2 * | 2/2016 | Vangeneugden | B29C 59/14 |
| 2008/0055594 | A1 | 3/2008 | Hadidi | |
| 2008/0199629 | A1 * | 8/2008 | Simor | B05D 1/62 427/488 |
| 2009/0120782 | A1 * | 5/2009 | Hammen | B29C 59/10 204/164 |
| 2009/0263295 | A1 | 10/2009 | Paulauskas et al. | |
| 2010/0047532 | A1 | 2/2010 | Mozetic et al. | |
| 2010/0178825 | A1 | 7/2010 | Shah et al. | |
| 2010/0320176 | A1 * | 12/2010 | Mohanty | H05H 1/42 219/121.37 |
| 2011/0232653 | A1 | 9/2011 | Imashiro et al. | |

FOREIGN PATENT DOCUMENTS

| | | |
|---|---|---|
| DE | 36 19 364 | 12/1987 |
| DE | 36 19 694 | 12/1987 |
| DE | 100 53 555 A1 | 5/2002 |
| JP | S61 119676 | 6/1986 |
| JP | 63-303071 | 12/1988 |
| JP | 07-185315 | 7/1995 |
| JP | 08-244123 | 9/1996 |
| JP | 10-018042 | 1/1998 |
| JP | 11-286561 | 10/1999 |
| JP | 2003-201570 | 7/2003 |
| JP | 2010-129197 | 6/2010 |
| JP | 2011-512459 | 4/2011 |
| JP | 2011 132053 | 7/2011 |
| WO | WO 02/25003 | 3/2002 |

OTHER PUBLICATIONS

Plasma Surface Modification for Cleaning and Adhesion, AST Products, Inc., © ??? 6 pages.
Enercon Non-Wovens Technical Report, Emerging Applications of Atmospheric Plasma Treatment (APT) for Non-Wovens, © ??? 2 pages.
Kinetic theory of partially ionized reactive gas mixtures, Giovangigli et al, © 2003 36 pages.

* cited by examiner

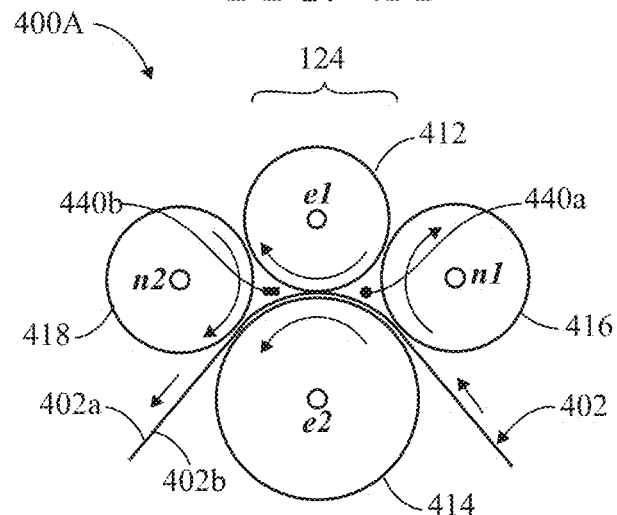
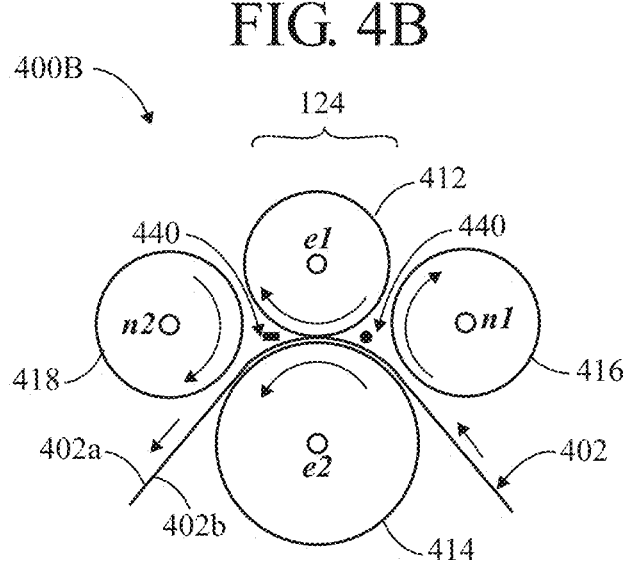

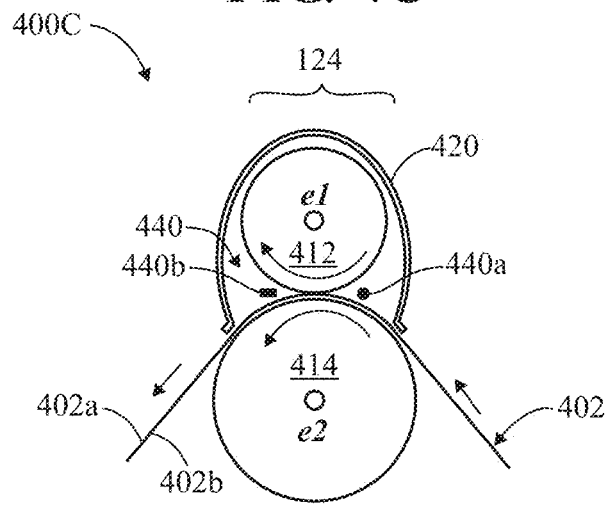
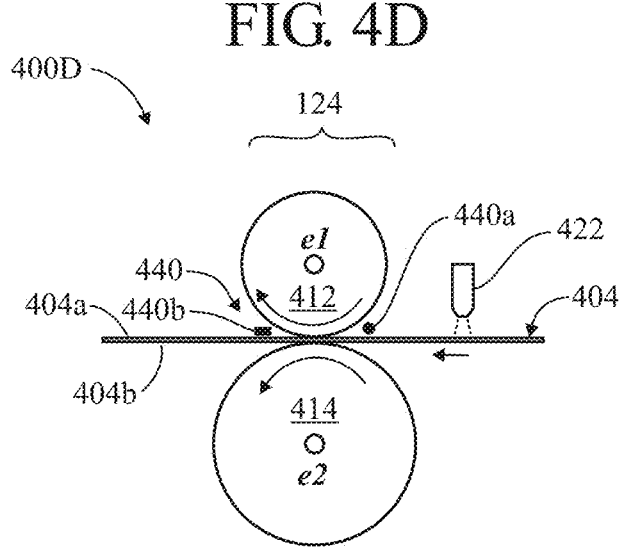

TREATING MATERIALS WITH COMBINED ENERGY SOURCES

CROSS-REFERENCE TO RELATED APPLICATION(S)

Priority is claimed from the following:
This is a nonprovisional of 61/745,765 filed 25 Dec. 2012
This is a continuation-in-part of Ser. No. 13/536,257 filed 28 Jun. 2012, which claims priority from 61/501,874 filed 28 Jun. 2011.

TECHNICAL FIELD

The invention relates to surface treatment of materials and various substrates, more particularly such as textiles, and more particularly to treatment of the materials with combined multiple diverse energy sources, typically one of which may be an atmospheric plasma (AP).

BACKGROUND

Development of "smart textiles" has been an active area of interest to improve various properties such as stain resistance, waterproofing, colorfastness and other characteristics achievable through advanced treatment using plasma technologies, microwave energy sources and in some cases, chemical treatments.

Atmospheric Plasma Treatment (APT) improves fiber surface properties such as hydrophilicity without affecting the bulk properties of these fibers, and can be used by textile manufacturers and converters to improve the surface properties of natural and synthetic fibers to improve adhesion, wettability, printability, dyeability, as well as to reduce material shrinkage.

Atmospheric-pressure plasma (or AP plasma or normal pressure plasma) is the name given to the special case of a plasma in which the pressure approximately matches that of the surrounding atmosphere. AP plasmas have prominent technical significance because in contrast with low-pressure plasma or high-pressure plasma no cost-intensive reaction vessel is needed to ensure the maintenance of a pressure level differing from atmospheric pressure. Also, in many cases these AP plasmas can be easily incorporated into the production line. Various forms of plasma excitation are possible, including AC (alternating current) excitation, DC (direct current) and low-frequency excitation, excitation by means of radio waves and microwave excitation. Only AP plasmas with AC excitation, however, have attained any noteworthy industrial significance.

Generally, AP plasmas are generated by AC excitation (corona discharge) and plasma jets. In the plasma jet, a pulsed electric arc is generated by means of high-voltage discharge (5-15 kV, 10-100 kHz) in the plasma jet. A process gas, such as oil-free compressed air flowing past this discharge section, is excited and converted to the plasma state. This plasma then passes through a jet head to arrive on the surface of the material to be treated. The jet head is at earth potential and in this way largely holds back potential-carrying parts of the plasma stream. In addition, the jet head determines the geometry of the emergent beam. A plurality of jet heads may be used to interact with a corresponding area of a substrate being treated. For example, sheet materials having treatment widths of several meters can be treated by a row of jets.

AP and vacuum plasma methods have been utilized to clean and activate surfaces of materials in preparation for bonding, printing, painting, polymerizing or other functional or decorative coatings. AP processing may be preferred over vacuum plasma for continuous processing of material. Another surface treatment method utilizes microwave energy to polymerize precursor coatings.

SOME PATENT REFERENCES

DE 3619694 (1987; Suppan) discloses method and apparatus for generating functional groupings of atoms in macromolecular substances. A perforated high-voltage electrode arranged at a defined distance from a substrate.

JP S61 119676 (1986; Ulvac) discloses forming a thin film at a high speed on a substrate to be treated by forming a sheet plasma containing a component element for the thin film to be formed in proximity to the substrate in parallel therewith and introducing laser light thereon perpendicularly to the substrate. The substrate to be formed therein with the thin film is disposed in a vacuum treatment chamber and is preliminarily heated to a prescribed temperature. The sheet plasma to be formed of the active gas or vapor for the thin film to be formed on the surface of the substrate is formed at 20-30 mm distance from the substrate in parallel therewith by a sheet plasma forming device consisting of a sheet plasma generating part and a sheet plasma accepting part. The laser light beam from a laser light generator is at the same time made incident toward the substrate perpendicularly to the plasma. The reaction efficiency of the active particles for vapor deposition entering the substrate from the plasma is increased by the incident of the laser light beam, by which the think film is formed at the high speed on the substrate.

US 2008055594 (2008; Hadidi) discloses hybrid plasma monitor. A ground electrode is spaced apart from a high voltage electrode supporting an electric discharge therebetween to generate a plasma. The ground electrode and the high voltage electrode form an annular region into which a sample is introduced for generating a plasma. Microwave radiation couples into the plasma to sustain the plasma. A light detector such as a spectrometer receives light resulting from atomic emissions from the sample to analyze elements in the sample.

US 20100320176 (2010; Mohanty) discloses a method and apparatus for forming layers on a target. The apparatus and method employ a direct current plasma apparatus to form at least one layer using a plasma jet containing precursors. In some embodiments, the direct current plasma apparatus utilizes axial injection of the precursors through the cathode (in an upstream and/or downstream configuration) and/or downstream of the anode. In some embodiments, the direct current plasma apparatus can comprise a laser source for remelting the layer using a laser beam to achieve in-situ densification thereof.

U.S. Pat. No. 3,959,104 (1976; Fales) discloses an electrical plasma discharge is established between adjacent tubular electrodes of an electrode structure having a stacked array of rows of tubular electrodes of opposite polarity row-by-row. A substrate is moved through the electrode structure along several paths of travel such that the electrical plasma discharge is substantially parallel to one or both surfaces of the moving substrate. During the electrical discharge, the electrodes are cooled by flowing coolant therethrough.

US 20100178825 (2010; Shah) discloses a composition includes a carbon nanotube (CNT)-infused carbon fiber material that includes a carbon fiber material of spoolable dimensions and carbon nanotubes (CNTs) infused to the carbon fiber material. The infused CNTs are uniform in length and uniform in distribution. The CNT infused carbon fiber material also includes a barrier coating conformally disposed about the carbon fiber material, while the CNTs are substantially free of the barrier coating. A continuous CNT infusion process includes: (a) functionalizing a carbon fiber material; (b) disposing a barrier coating on the functionalized carbon fiber material (c) disposing a carbon nanotube (CNT)-forming catalyst on the functionalized carbon fiber material; and (d) synthesizing carbon nanotubes, thereby forming a carbon nanotube-infused carbon fiber material.

US 20110232653 (2011; Imashiro) discloses an antimicrobial, dustproof fabric includes a textile material layer which is composed of microfibers with an average fiber diameter of from 1 to 100 μm and contains an inorganic porous substance, and a nanofiber nonwoven fabric layer which is laminated on the textile material layer and has an average fiber diameter of at least 1 nm but less than 1,000 nm. Hygienic products such as masks obtained using the fabric efficiently block microbes such as viruses, and inactivate or destroy the captured microbes.

U.S. Pat. No. 5,554,415 (1996, Turchan et al.) discloses substrate coating techniques, including fabricating materials on a surface of a substrate. Energy, such as from one or more lasers, is directed at the surface of a substrate to mobilize and vaporize a constituent element (e.g., carbide) within the substrate (e.g., steel). The vaporized constituent element is reacted by the energy to alter its physical structure (e.g., from carbon to diamond) to that of a composite material which is diffused back into the substrate as a composite material. An additional secondary element, which can be the same as or different from the constituent element, may optionally be directed (e.g., sprayed) onto the substrate to augment, enhance and/or modify the formation of the composite material, as well as to supply sufficient or additional material for fabricating one or more coatings on the surface of the substrate. The process can be carried out in an ambient environment (e.g., without a vacuum), and without pre-heating or post-cooling of the substrate.

SUMMARY

The invention is generally directed to providing improved techniques for treatment (such as surface treatment and modification) of materials, such as substrates, more particularly such as textiles (including woven or knitted textiles and non-woven fabrics), and broadly involves the combining of various additional energy sources (such as laser irradiation) with high voltage generated plasma(s) (such as atmospheric pressure (AP) plasmas) for performing the treatments, which may alter the core of the material being treated, as well as the surface, and which may use introduced gases or precursor materials in a dry environment. Combinations of various energy sources are disclosed.

An embodiment of the invention broadly comprises method and apparatus to treat and produce technical textiles and other materials utilizing at least two combined mutually interacting energy sources such as laser and high voltage generated atmospheric (AP) plasma.

The techniques disclosed herein may readily be incorporated into a system for the automated processing of textile materials. Functionality may be achieved through non-aqueous cleaning like etching or ablating, activating by way of radical formation on the surface(s) and simultaneously and selectively increasing or decreasing desired functional properties. Properties such as hydrophobicity, hydrophilicity fire retardency, anti-microbial properties, shrink reduction, fiber scouring, water repelling, low temperature dyeing, increased dye take up and colorfastness, may be enabled or enhanced, increased or decreased, by the process(es) which produces chemical and/or morphological changes, such as radical formation on the surface of the material. Coatings of material, such as nano-scale coatings of advanced materials composition may be applied and processed.

Combining (or hybridizing) AP plasma energy with one or more additional (or secondary) energy sources such as a laser, X-ray, electron beam, microwave or other diverse energy sources may create a more effective (and commercially viable) energy milieu for substrate treatment. The secondary energy source(s) may be applied in combination (concert, simultaneously) with and/or in sequence (tandem, selectively) with the AP plasma energy to achieve desired properties. Secondary energy sources may act upon the separately generated plasma plume and produce a more effective, energetic plasma milieu, while also having the ability to act directly on the surface and in some cases, the core of the material subjected to this hybrid treatment.

The techniques disclosed herein may be applicable, but not limited to the treatment of textiles (both organic and inorganic), paper, synthetic paper, plastic and other similar materials which are typically in flat sheet form ("yard goods"). The techniques disclosed herein may also be applied to the processing of plastic or metal extrusion, rolling mills, injection molding, spinning, carding, weaving, glass making, substrate etching and cleaning and coating of any material as well as applicability to practically any material processing technique. Rigid materials such as flat sheets of glass (such as for touch screens) may be treated by the techniques disclosed herein.

Some non-limiting examples of the techniques disclosed herein may include:

A method for treatment of a substrate (102, 402, 404) comprising:
    creating a plasma in a treatment region (124) comprising two spaced-apart electrodes (e1/e2; 212/214; 412/414; 452/454);
    directing at least one second energy source which is different than the first energy source into the plasma to interact with the plasma, resulting in a hybrid plasma; and
    causing the hybrid plasma to interact with the substrate in a treatment region (124).

In another aspect, the present invention encompasses an apparatus (100, 400A, 400B, 400C, 400D, 400E, 400F, 400G) for treating materials comprising:
    two spaced-apart electrodes (e1/e2; 212/214; 412/414) for generating a plasma in a treatment region (124);
    one or more lasers (130) directing corresponding one or more beams (132) into the treatment area to interact with at least one of the plasma and the material being treated.

In a further aspect, the present invention comprehends a use of the apparatus described herein for treating a textile substrate In a different aspect, the present invention envisages a textile material obtained by the method described herein.

A plasma for material treatment may comprise a hybrid atmospheric pressure (AP), plasma enhanced, chemical vapor deposition (PECVD) process, excited and sustained by one or more UV light source(s) (such as excimer laser, UV LEDs), and where volatile organic materials such as polyborosiloxane may be evaporated into the plasma carrier gas to promote formation of functional coatings such as for fire retardancy at commercial web speeds (20 meters/minute and more).

Some advantages of the present invention may include, without limitation, a method of creating a more energetic and effective plasma to clean and activate surfaces for subsequent processing or finishing. For example, ultra-violet (UV) laser radiation, either continuous wave (CW) or pulsed, may be combined with electromagnetically generated AP plasma to create a more highly ionized and energetic reaction milieu for treating surfaces. The resulting hybridized energy may have effects that are greater than the sum of its individual parts. Pulsed laser energy may be used to drive the plasma, creating waves, and the laser energy accelerates the resultant plasma waves which act upon the substrate like waves crashing on the beach.

The accelerated and more energetic plasma may initiate radicals in the fiber or surface of the treated substrate and attach ionized groups to the initiated radicals. Attachment of such functional groups as carboxyl, hydroxyl or others attach to the surface increasing polar characteristics may result in greater hydrophilicity and other desirable functional properties.

The invention advantageously combines energy sources in a controlled atmospheric environment in the presence of a material substrate. The net result may be conversion and material synthesis in the surface of the substrate—the substrate may be physically changed, in contrast with simply being coated.

In an exemplary embodiment, a high frequency RF plasma is created in an envelope (or cavity, or chamber) formed between rotating and driven rollers which extend across the width of the processing window. (The RF for the plasma may be supplied by a generator/external power source, not shown, well known.) The plasma field generated is consistent across the width of a treatment area, and may operate at atmospheric pressure. A high power Ultra Violet UV) laser is provided for interacting with the plasma and/or the material being treated. The beam from the laser may be shaped to have a rectangular cross-section exhibiting a consistent power density over the entire treatment area. A gas delivery system may be used to combine any combination of a plurality (such as 4) of environmental gases and precursors into a single feed or multiple combined feeds which populates the hybrid plasma chamber. Additionally, a spray or misting delivery system may be provided, capable of applying a thin, consistent layer of sol-gel or process accelerants to the material being treated, either pre- or post-processing.

Combining or evaporating mixtures of precursors in the environmental and reaction gases directly into the plasma enables in situ synthesis for the desired treatment functionality. This allows for dry treatment of the substrate material (such a fabric), without preparing the fabric. As used herein, "environmental gases" may be plasma-producing gases such (but not limited to) as nitrogen and helium, and reaction gases may comprise such as carbon dioxide, acetylene, etc.

The process of combining plasma and photonics (such as UV laser) is dry, is carried out at atmospheric pressures and uses safe and inert gases (such as Nitrogen, Oxygen, Argon & Carbon Dioxide). Changing the power intensity of the laser and the plasma, and then varying the environmental gases or the addition of sol-gels and/or other organic or inorganic precursors—i.e., changing the "recipe"—allows the system to generate a wide variety of process applications.

There are several applications for the process, including: cleaning, preparation and performance enhancement of materials.

For cleaning, the laser may intensify the effective power of the plasma as well as acting on the substrate material in its own right.

For preparing the substrate material for secondary processing, such as dyeing, the surface of the fibers may be ablated in a controlled manner, thereby increasing the hydrophilicity of the material (such as a textile material). Additionally, be introducing environmental gases into the process zone of the system, chemistries may be created at the surface of the material (e.g., fabric) which may result in chemistries that react with a dyeing media to effect a more efficient dye penetration or a more intense coloring process or reduction of dye temperature. For example, preparing the fibers of the textile to give a better controlled uptake of chrome oxide dyes to improve the intensity of black achieved. There is, therefore, potential for this process to reduce the chemical content of dyes which could reduce both negative environmental impact and processing costs.

For Performance Enhancement, the process may achieve material synthesis in the surface of the substrate. By altering the laser and plasma frequencies and the power intensities, and introducing other materials into the process environment, the system ablates the surface of the substrate and a series of chemical reactions between the substrate and the environmental gases synthesize new materials in the surface of the fibers in the textile web.

In some exemplary embodiments, a method for treating a material may comprise: creating a plasma using a first energy source in a process chamber having a treatment region (or area); and feeding the material through the treatment region; and may be characterized by: directing at least one second energy source which is different than the first energy source into the plasma to interact with the plasma, resulting in a hybrid plasma; and causing the hybrid plasma to more effectively interact with the material being treated in the treatment region. The method may further comprise feeding the material being treated to the process chamber through a twitcher system. The material being treated may comprise strands of fibers or yarns, or may comprise pieces of fabric material disposed on a carrier membrane. Prior to feeding the material (504, 506, 606) through the process chamber, precursors or accelerants may be applied to the carrier membrane as either (i) a spray, (ii) through roller deposition, (iii) through electrostatic discharge (iv) a bath through which the substrate is passed, and/or (v) by evaporation or other means mixing volatile organic or metalo-organic materials directly into the plasma carrier gas. Treatment may comprise one or more of (i) reacting the precursors or accelerants in the treatment region to become incorporated with (into or onto) the substrate; (ii) reacting the precursors or accelerants directly with the substrate; and (iii) reacting gases and chemistry in the plasma with the substrate.

For each of the treatments, different process parameters may be employed to selectively achieve desired results. Different sequences and combinations of the process parameters may be employed on a given material being treated. Electrostatic deposition may be used to dope fabrics or yard goods materials with dopants before they enter the process chamber. Dopants may comprise oxide powders or natural or synthetic fibers applied to the surface of the substrate material. Oriented fibers or pre-doped fibers may be applied to the substrate surface (material being treated). The substrate may be electrostatically biased in the treatment region to cause the fibers to extend out from the substrate and to be more receptive to implantation of ionized materials which are products of the hybrid plasma.

The treatment may alter the topographical structure of materials which comprise individual fibers or fibers or yarns within a woven or knitted fabric. Different treatments may be performed on each side of a material being treated. A material being treated may be passed several times through the treatment region, using the same or different precursors or different process parameters. Multiple energy sources may be used simultaneously to react with different elements within the substrate material. A bank of laser beams may impinge on the plasma and/or material being treated.

BRIEF DESCRIPTION OF THE DRAWINGS

Reference may be made in detail to embodiments of the disclosure, some non-limiting examples of which may be illustrated in the accompanying drawing figures (FIGs). The figures are generally diagrams. Some elements in the figures may be exaggerated (not to scale with respect to other elements), others may be omitted, for illustrative clarity. The relationship(s) between different elements in the figures may be referred to by how they appear and are placed in the drawings, such as "top", "bottom", "left", "right", "above", "below", and the like. It should be understood that the phraseology and terminology employed herein is not to be construed as limiting, and is for descriptive purposes only.

FIGS. 4A-4G are diagrams of elements in a treatment region of the treatment system of FIG. 1, according to some embodiments of the invention.

DETAILED DESCRIPTION

The invention relates generally to treatment (such as surface treatment) of materials (such as textiles) to modify their properties.

Various embodiments will be described to illustrate teachings of the invention(s), and should be construed as illustrative rather than limiting. Although the invention is generally described in the context of various exemplary embodiments, it should be understood that it is not intended to limit the invention to these particular embodiments. An embodiment may be an example or implementation of one or more aspects of the invention(s). Although various features of the invention(s) may be described in the context of a single embodiment, the features may also be provided separately or in any suitable combination with one another. Conversely, although the invention(s) may be described in the context of separate embodiments, the invention(s) may also be implemented in a single embodiment.

In the main hereinafter, surface treatment of substrates which may be textiles supplied in roll form (long sheets of material rolled on a cylindrical core) will be discussed. One or more treatments, including but not limited to material synthesis, may be applied to one or both surfaces of the textile substrate, and additional materials may be introduced. As used herein, a "substrate" may be a thin "sheet" of material having two surfaces, which may be termed "front" and "back" surfaces, or "top" and "bottom" surfaces.

Some Embodiments of the Invention

The following embodiments and aspects thereof may be described and illustrated in conjunction with systems, tools and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, well-known features may be omitted or simplified in order not to obscure the descriptions of the invention(s).

Figure 1:
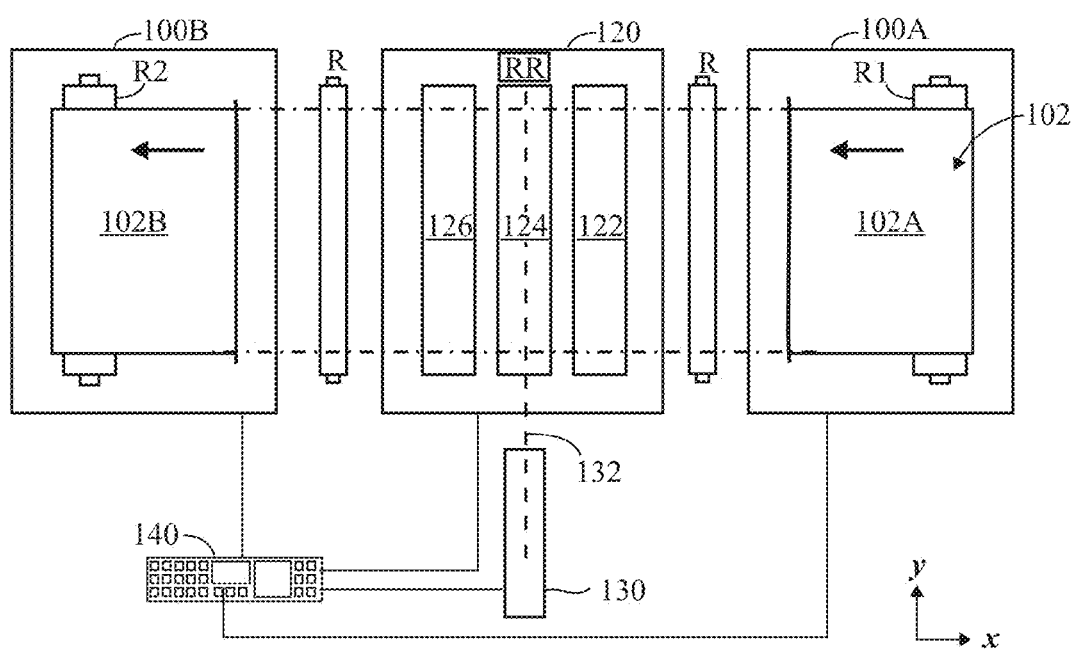
FIG. 1 is a diagram of a treatment system, according to an embodiment of the invention.

FIG. 1 shows an overall surface treatment system 100 and method of performing treatment, such as a surface treatment of a substrate 102. In the figures presented herein, the substrate 102 will be shown advancing from right-to-left through the system 100.

The substrate 102 may for example be a textile material and may be supplied as "yard goods" as a long sheet on a roll. For example, the substrate to be treated may be fibrous textile material such as cotton/polyester, approximately 1 meter wide, approximately 1 mm thick, and approximately 100 meters long.

A section 102A, such as a 1 m×1 m section of the substrate 102 which is not yet treated is illustrated paying out from a supply reel R1 at an input section 100A of the system 100. From the input section 100A, the substrate 102 passes through a treatment section 120 of the apparatus 100. After being treated, the substrate 102 exits the treatment apparatus 120, and may be collected in any suitable manner, such as wound up on a take-up reel R2. A section 102B, such as a 1 m×1 m section of the substrate 102 which has been treated is illustrated being wound onto an takeup reel R1 at an output section 100A of the system 100. Various rollers "R" may be provided between (as shown) and within (not shown) the various sections of the system 100 to guide the material through the system.

The treatment section (or process chamber) 120 may generally comprise three regions (or areas, or zones):
   optionally, a pre-treatment (or precursor) region 122,
   a treatment (or plasma) region (or area) 124, and
   optionally, a post-treatment (or finishing) region 126.

The treatment region 124 may comprise components for generating a high voltage (HV) alternating current (AC)

atmospheric plasma (AP), the elements of which are generally well known, some of which will be described in some detail hereinbelow.

A laser 130 may be provided, as the secondary energy source, for providing a beam 132 which interacts with the AP in the main treatment region 124, and which may also impinge on a surface of the substrate 102.

A controller 140 may be provided for controlling the operation of the various components and elements described hereinabove, and may be provided with the usual human interfaces (input, display, etc.).

Figure 2:
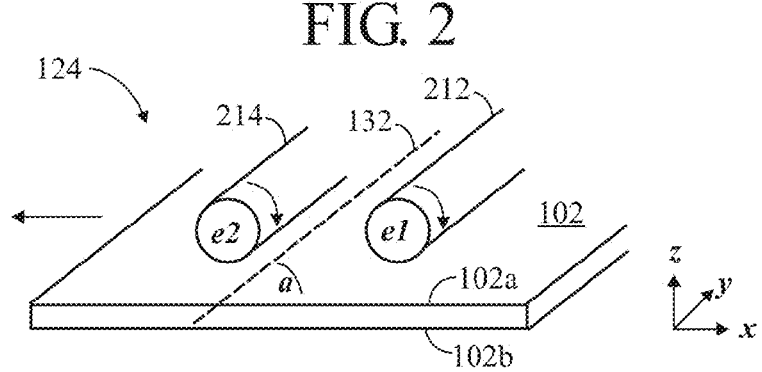
FIG. 2 is a partial perspective view of a plasma region of the treatment system of FIG. 1.

FIG. 2 shows a portion of and some operative elements within the main treatment region 124. Three orthogonal axes x, y and z are illustrated. (In FIG. 1, the corresponding x and y axes are illustrated.)

Two elongate electrodes 212 (e1) and 214 (e2) are shown, one of which may be considered to be a cathode, the other of which may be considered to be an anode. These two electrodes e1 and e2 may be disposed generally parallel with one another, extending parallel to they axis, and spaced apart from one another in the x direction. For example, the electrodes e1 and e2 may be formed in any suitable manner, such as in the form of a rod, or a tube or other rotatable cylindrical electrode material, and spaced apart from one another nominally, a distance sufficient to allow for clearance of the thickness of the material processed. The electrodes e1 and e2 may be disposed approximately 1 mm above the top surface 102a of the substrate 102 being treated.

The electrodes e1 and e2 may be energized in any suitable manner to create an atmospheric plasma (AP) along the length of the resulting cathode/anode pair in a space between and immediately surrounding the electrodes e1 and e2, which may be referred to as a "plasma reaction zone".

As mentioned above, a laser beam 132 may be directed into the main treatment region 124, and may also impinge on a surface of the substrate 102. Here, the laser beam 132 is shown being directed approximately along the y axis, approximately parallel to and between the electrodes e1 and e2, and slightly above the top surface 102a of the substrate 102, so as to interact with the plasma (plume) generated by the two electrodes e1 and e2. In an exemplary application, the beam footprint may be a rectangle approximately 30 mm×15 mm. The beam footprint (or cross-section) may be oriented vertically or horizontally to best achieve the desired interaction of plasma and/or direct substrate irradiation.

The laser beam 132 may be directed minutely but sufficiently "off angle" to directly irradiate the substrate 102 to be treated as it coincidently reacts with the plasma being generated by the two electrodes e1 and e2. More particularly, the laser beam 132 may make an angle of "a" which is approximately 0 degrees with the top surface 102a of the substrate 102 so as not to impinge on its surface 102a. Alternatively, the laser beam 132 may make an angle of "a" which is approximately less than 1-10 degrees with the top surface 102a of the substrate 102 so as to impinge on its surface 102a. Other orientations of the beam 132 are possible, such as perpendicular ("a"=90 degrees) with the surface 102a of the substrate 102. The laser beam 132 may be scanned, using conventional galvanometers and the like, to interact with any selected portion of the plasma generated by the two electrodes e1 and e2 or the substrate 102, or both.

The plasma may be created using a first energy source such as high voltage (HV) alternating current (AC). A second, different energy source (such as laser) may be caused to interact with the plasma, resulting in a "hybrid plasma", and the hybrid plasma may be caused to interact (in a treatment region) with the substrate (material) being treated. In addition to interacting with the first energy source, the second energy source can be caused to also interact directly with the material being treated. The direct interaction with the substrate or other gas (secondary or precursor) may produce its' own laser sustained plasma which in turn may further interact with the high voltage generated plasma to more highly energize the reaction milieu.

Figure 2A:
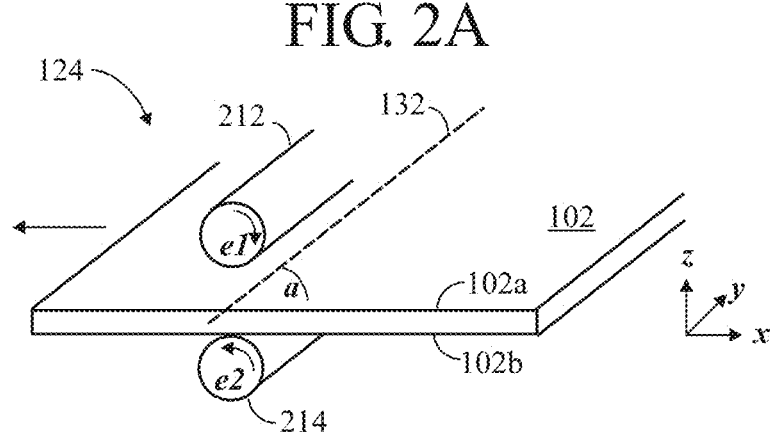
FIG. 2A is a partial perspective view of a plasma region of the treatment system of FIG. 1.

The substrate 102 (material being treated) may be guided by rollers as it passes through the main treatment region (area) 124. FIG. 2A illustrates that one of these rollers 214 may serve as the anode, and the other roller 212 may serve as the cathode (or vice-versa) of a cathode/anode pair for generating the plasma. It may be noted that in FIG. 2, the substrate 102 is disposed to one side of (below, as viewed) both of the two electrodes e1 and e2, and in FIG. 2A the substrate 102 is disposed between the two electrodes e1 and e2. In both cases, the plasma created by the electrodes e1 and e2 acts on at least one surface of the substrate 102. (The substrate material passes through or immediately adjacent to the plasma.) The anodes and cathodes (electrodes e1 and e2) may be coated with an insulating material, such as ceramic. Cooling may be provided, such as coolant flowing through the electrodes e1 and e2 to prevent cracking of the ceramic.

It should be understood that the invention is not limited to any particular arrangement or configuration of electrodes e1 and e2, and that the examples set forth in FIGS. 2, 2A are intended to be merely illustrative of some of the possibilities. Furthermore, for example, as an alternative to using two electrodes e1 and e2, a row of plasma jets (not shown) delivering a plasma may be provided to create the desired plasma above the surface 102a of the substrate 102.

Figure 3:
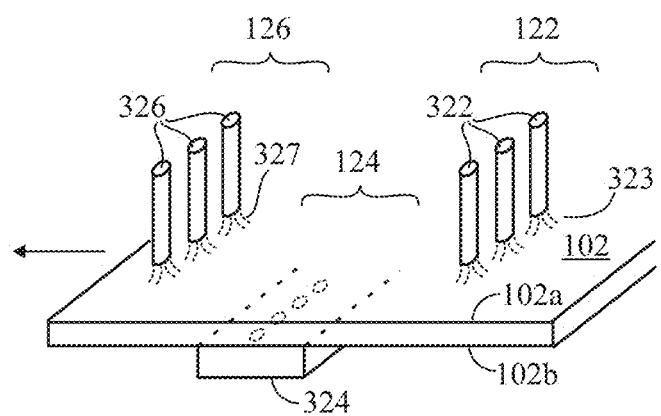
FIG. 3 is a partial perspective view of a pre-treatment region, plasma region and post-treatment region of the treatment system of FIG. 1, according to some embodiments of the invention.

FIG. 3 shows that in the pre-treatment region (area) 122, a row of spray heads (nozzles) 322 covering the full width of the material to be treated, or other suitable means, may be used to dispense precursor materials 323 in solid, liquid or gaseous phase onto the substrate 102 to enable the processing of/for specific properties such as antimicrobial, fire retardant or super-hydrophobic/hydrophilic characteristics.

There may be an intermediate "buffer" zone between the pre-treatment region (area) 122 and the main treatment region (area) 124, to allow time for the materials applied in pre-treatment to soak into (be absorbed by) the substrate. The process still runs a single length of material, but the buffer may hold, for example, up to 200 m of fabric. For example, when material being treated (such as yard goods) is feeding through the system at 20 meters/min, this would allow for several minutes "drying time" between pre-treatment (122) and hybrid plasma treatment (124), without stopping the flow of material through the system.

Similarly, in the post-treatment region (area) 126, a row of spray heads (nozzles) 326 covering the full width of the material which was treated (124), or other suitable means, may be used to dispense finishing materials 327 in solid, liquid or gaseous phase onto the substrate 102 to imbue it with desired characteristics.

Some Embodiments of the Treatment Region (124)

FIGS. 4A-4G illustrate various embodiments of elements in the treatment region 124.

FIG. 4A illustrates an embodiment 400A wherein:

A first ("top") roller 412 is operative to function as an electrode e1, and may have a diameter of approximately 10 cm, and a length (into the page) of 2 meters.

The roller 412 may have a metallic core and a ceramic (electrically insulating) outer surface.

A second ("bottom") roller 414 is operative to function as an electrode e2, and may have a diameter of approximately 15 cm, and a length (into the page) of 2 meters. The roller 414 may have a metallic core and a ceramic (electrically insulating) outer surface.

The second roller 414 is disposed parallel to and directly underneath (as viewed) the first roller 412, with a gap therebetween corresponding to (such as slightly less than) the thickness of the substrate material 402 (compare 102) being fed between the rollers 412 and 414. The direction of material travel may be right-to-left, as indicated by the arrow. The substrate 402 has a top surface 402a (compare 102a) and a bottom surface 402b (compare 102b).

The first roller 412 may serve as the "anode" of an anode/cathode pair, having high voltage (HV) supplied thereto. The second roller 414 may serve as the "cathode" of the anode/cathode pair, and may be grounded.

A first ("right") nip or feed roller 416 (n1) may be disposed adjacent a bottom-right (as viewed) quadrant of the first roller 412 (with a gap therebetween, not engaging), and nearly against a top-right (as viewed) quadrant of the second roller 414. The roller 416 may have a diameter of approximately 12 cm, and a length (into the page) of 2 meters. A gap between the outer surface of the roller 416 and the outer surface of the roller 414 corresponds to (such as slightly less than) the thickness of the substrate material 402 (compare 102) being fed between the rollers 416 and 414. (The outer surface of the roller 416 may lightly/resiliently engage the outer surface of the roller 412, allowing substrate material to be fed therebetween).

A second ("left") nip or feed roller 418 (n2) may be disposed adjacent a bottom-left (as viewed) quadrant of the first roller 412 (with a gap therebetween, not engaging), and nearly against a top-left (as viewed) quadrant of the second roller 414. The roller 418 may have a diameter of approximately 12 cm, and a length (into the page) of 2 meters. A gap between the outer surface of the roller 418 and the outer surface of the roller 414 corresponds to (such as slightly less than) the thickness of the substrate material 402 (compare 102) being fed between the rollers 418 and 414. (The outer surface of the roller 418 may lightly/resiliently engage the outer surface of the roller 412, allowing substrate material to be fed therebetween).

Generally, the nip or feed rollers 416, 418 should have an insulating outer surface so as to avoid shorting the anode and cathode 412, 414.

With such an arrangement of rollers 412, 414, 416, 418, a semi-airtight cavity ("440") may be formed between the outer surfaces of the four rollers 412, 414, 416, 418 for defining the treatment region 124 and containing the plasma. The overall cavity 440 may comprise a first ("right") portion 440a in the space between the top, right and bottom rollers 412, 416, 414 and a second ("left") portion 440b in the space between the top, left and bottom rollers 412, 418, 414. The filled circle at the end of the lead line for the right portion 440a of the cavity 440 represents gas flow into the cavity. The filled rectangle at the end of the lead line for the left portion 440b of the cavity 440 represents the laser beam (132).

The plasma generated in the cavity 440 may be an atmospheric pressure (AP) plasma. Therefore, sealing of the cavity 440 is not necessary. However, end caps or plates (not shown) may be disposed at the ends of the rollers 412, 414, 416, 418 to contain (semi-enclose) and control the gas flow in and out of the cavity 440.

FIG. 4B illustrates an embodiment 400B wherein the left and right rollers 416 and 418 are moved slightly outward from the rollers 412 and 414, thereby opening up the cavity 440 to allow for thicker and/or stiffer substrates to be processed. This would however require independent or direct drive of each electrode, anode and cathode. The material would be driven through the reaction zone by outside feeding and take up rollers.

FIG. 4C illustrates an embodiment 400C wherein a generally inverted U-shaped shield 420 is used instead of the left and right rollers (416 and 418) to define the cavity 440 having right and left portions 440a and 440b. The shield 420 is disposed substantially completely around one roller 412 (except for where the material feeds through), and at least partially around the other roller 414. The shield 420 may have a highly reflective or mirrored inner (oriented towards the electrodes) surface. An additional shield (not shown) could be disposed under the bottom roller 414.

FIG. 4D illustrates an embodiment 400D adapted to treat rigid substrates. The substrate 402 described above was flexible, such as textile. Rigid substrates such as glass for touch screen displays may also be treated with a hybrid plasma and precursor materials. A rigid substrate 404 having a top surface 404a and bottom surface 404b passes through the top roller (e1) 412 and the bottom roller (e2) 414. A row of nozzles 422 (compare 322) may be arranged to provide precursor material, such as in liquid, solid or atomized form. A shield (not shown) such as 420 (refer to FIG. 4C) may be incorporated to contain the hybrid plasma.

Figure 4E:
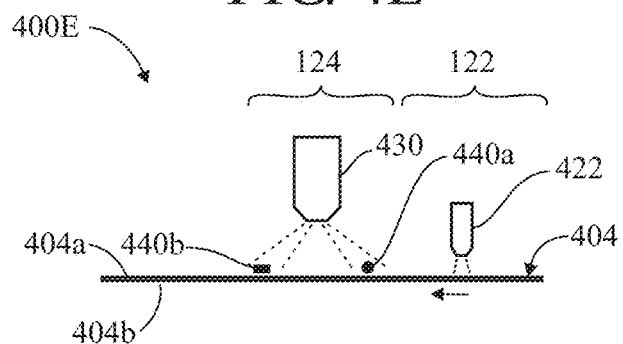

FIG. 4E shows an arrangement 400E incorporating a row of HV plasma nozzles (jets) 430, rather than the cylindrical electrodes e1 and e2. For example, ten jets 430 spaced at 20 cm intervals in the treatment region 124. A rigid substrate 404 is shown. A row of nozzles 422 (compare 322) may be arranged to provide precursor material, such as in atomized form, onto the substrate 404, in a pre-treatment region 122, before it is exposed to the hybrid plasma. For example, ten nozzles 422 spaced at 20 cm intervals in the pre-treatment region 122. A shield (not shown) such as 420 (refer to FIG. 4C) may be incorporated to contain the hybrid plasma. This arrangement enables treatment of metallic or other conductive substrates.

Figure 4F:
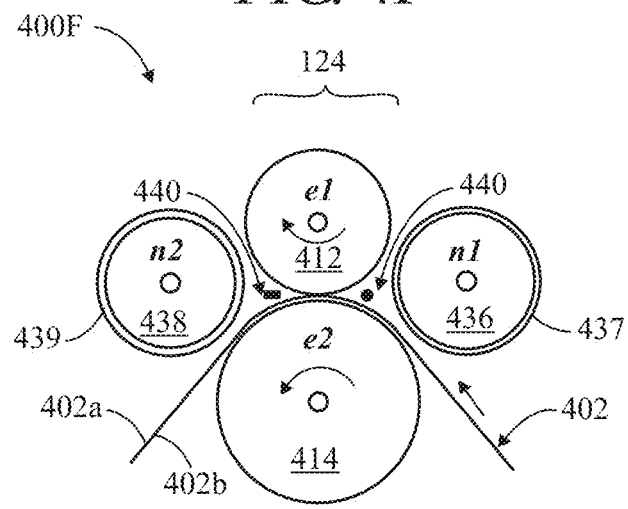

FIG. 4F illustrates an embodiment 400F a first ("top") roller 412 operative to function as an electrode e1 (or anode), a second ("bottom") roller 414 operative to function as an electrode e2 (or cathode), and two nip rollers 436 and 438 (compare 416 and 418).

In contrast with the embodiment 400A (FIG. 4A), in this embodiment the rollers 436 and 438) are spaced outward slightly (such as 1 cm) from the top and bottom rollers 412 and 414. Therefore, although they will still help contain the plasma, they may not function as feed rollers, and separate feed rollers (not shown) may need to be provided, or the substrate may be driven by the (rotating) electrode rollers e1 and e2.

The right roller 436 (compare 416) is shown having a layer or coating 437 on its surface. The left roller 438 (compare 418) is shown having a layer or coating 439 on its surface. For example, the rollers 436 and 438 in the hybrid plasma treatment region 124 may be wrapped with metallic foil (or otherwise have a metallic outer layer) which may be etched away, in process, by the highly energetic hybrid plasma and/or by the laser (second energy source) creating a plume containing a reactive metallic plasma which may readily couple with the substrate surface radicals to create nano-layer coatings with metallic composition on the substrate material. The metallic material (foil, layer) may be controllably etched or ablated by the plasma, and the effluent metallic constituents may react with the plasma and be deposited on the substrate, such as in nano-scale layers.

The metallic material coating the rollers 436 and 438 may comprise any one or combination of titanium, copper, aluminum, gold or silver, for example. One of the rollers may be coated with one material, the other of the rollers may be coated with another material. Different portions of the rollers 436 and 438 may be coated with different materials. Generally, when these materials are ablated, they form vapor precursor material, in the treatment region 124 (and may therefore be contrasted with the nozzles 322 and 422 providing precursor material in the pre-treatment region 124.)

Figure 4G:
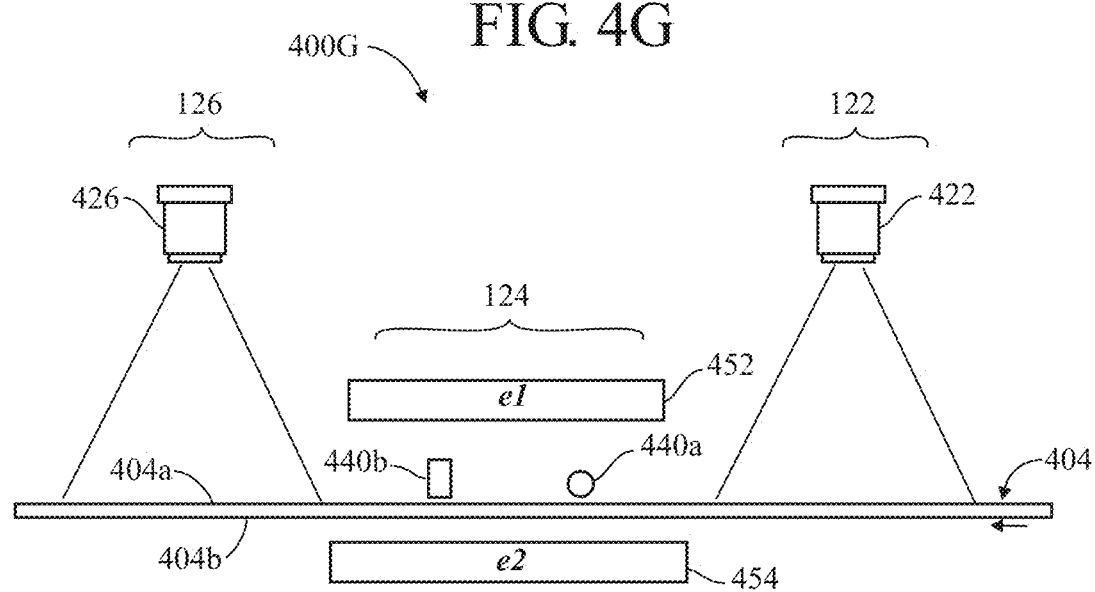

FIG. 4G illustrates an embodiment 400G using two flat sheet, plate electrodes 452 and 454, rather than rollers (412, 414), spaced apart from one another to form a treatment region (reaction/synthesis zone) 124 through which a sheet of material 404 may be fed. Gas feed to the treatment region is indicated by the circle 440a, the laser beam is indicated by the rectangle 440b. Nozzles 422 may be provided to deliver precursor material(s) in the pre-treatment zone 122. Nozzles 426 may be provided to deliver finishing material(s) in the post-treatment zone 126.

Additional Features

Although not specifically shown, finishing materials dispensed onto the substrate 102 after hybrid energy treatment (124) may be subjected to an immediate secondary plasma or hybrid plasma exposure to dry, seal or react finishing materials which have been dispensed following activation of the surface by the hybrid plasma.

Although not specifically shown, it should be understood that various gases, such as 02, N2, H, CO2, Argon, acetylene, He, or compounds such as silane or siloxane-based materials may be introduced into the plasma, such as in the treatment region 124, or directly into the plasma-carrier gas upstream of the plasma, to impart various desired characteristics and properties to the treated substrate.

To impart anti-microbial properties to the material being treated, precursor materials may be introduced such as non-silver based silanes/siloxanes and the aluminum chloride family such as 3 (trihydroxylsilyl) propyldimethyl octadecyl, ammonium chloride. Other Silane/Siloxane groups may be used to affect hydrophobicity as well as siloxones and ethoxy silanes (to increase hydrophilicity). Hexamethylidisiloxane applied in the gaseous phase in the plasma may smooth the surface of textile fibers and increase the contact angle which is an indication of the level of hydrophobicity.

Negative draft or atmospheric partial vacuum may be employed to draw plasma constituents into and further penetrate the thickness of porous substrates. FIG. 3 shows that suction means, such as platen (bed) 324 over which the substrate 102 passes, in the treatment area 124, may be provided with a plurality of holes and connected in a suitable manner to suction means (not shown) to create the desired effect. The platen 324 may function as one of the electrodes for generating the plasma. Alternatively, a roller or the like could readily be modified (with holes and connected with suction means) to perform this function.

It should be understood that the process is dry and has a low environmental impact, and that leftover or byproduct gases or constituents are inherently safe and may be exhausted from the system and recycled or disposed of in an appropriate manner.

There is thus provided a method of treating materials with at least two energy sources, wherein the two energy sources comprise (i) an AP plasma produced by various gases passing through a high energy electromagnetic field and (ii) at least one laser interacting with said plasma to create a "hybrid plasma". The laser may operate in the ultra-violet wave length range, such as at 308 nm or less. The laser may comprise an excimer laser operating with at least 25 watts of output power, including more than 100 watts, more than 150 watts, more than 200 watts. The laser may be pulsed, such as at a frequency of 25 Hz or higher, such as 350-400 Hz, including picosecond and femtosecond lasers. Although only one laser has been described interacting with the plasma (and the substrate), it is within the scope of the invention that two or more lasers may be used, and that the lasers may operate at various wavelengths as determined by the absorption characteristics of the reaction milieu.

Some exemplary parameters for generating the plasma in the treatment region are 1-2 Kw (kilowatts) for the HV generated plasma and 500 mjoules, 350 Hz for the 308 nm UV laser, in an 80% argon, 20% Oxygen or CO2 gas mix.

As an alternative to or in addition to using a laser, an ultraviolet (UV) source such as a UV lamp or an array of high powered UV LEDs (light-emitting diodes) disposed along the length of the treatment area may be used to direct energy into the AP plasma to create the hybrid plasma, as well as to interact with (such as to etch, react and synthesize upon) the material being treated.

In the main, hereinabove, treating one surface 102a of a substrate material 102 was illustrated, and some exemplary treatments were described. It is within the scope of the invention that the opposite bottom surface 102b of the material 102 may also be treated, such as by looping the material 102 back through the treatment region 124. Different energy sources and milieus, precursor and finishing materials may be used to treat the second surface of the material. In this manner, both surfaces of the material may be treated. It should also be understood that the treatments may extend to within the surface of the material being treated to alter or enhance properties of the inner (core) material. In some cases, both top and bottom surfaces as well as the core of the material may be effectively treated from one side.

The system can be used to treat materials which are in other than sheet form. For example, the system may be used for improving optical and morphological properties of organic light-emitting diodes (OLEDs) by hybrid energy annealing. These discrete items may be transported (conveyed) through the system in any suitable manner.

Other types of energy may be applied in combination or in sequence with each other to create enhanced processing capabilities. For example, a method of treating materials may utilize the combination of at least two energy sources such as microwave and laser, or microwave and electromagnetically generated plasma, or plasma and microwave, or various combinations of HV or RF generated plasma, laser and pulsable microwave electron cyclotron resonance (ECR).

The two energy sources may comprise (i) an atmospheric plasma, utilizing various ionized gases passed through high energy electromagnetic fields, and (ii) an ultra violet (UV) source generating and directing radiation into the highly ionized plasma and directly at the surface to be treated. The UV source may comprise an array of high powered UV LEDs (light-emitting diodes) disposed along the extent of the treatment area. The high powered ultra-violet LEDs may interact with the plasma to more highly energize the plasma, as well as acting directly on the substrate to etch or react said substrate.

An automated material handling system may controllably (and continuously) feed material through the energy fields produced by combination energy sources.

A series of process steps may be performed, such as:
step 1—(optional) precursor application,
step 2—exposure to hybrid energy,
step 3—(optional) precursor or finishing material application and,
step 4—exposure to hybrid energy.
in which all steps may be accomplished in serial fashion immediately within the system.

It is within the scope of the invention to introduce into the process a delivery system capable of adding gas/vapor phase precursor materials directly in to the plasma reaction zone and/or optionally mixed with the plasma producing gases upstream of plasma feeding.

Some Exemplary Treatment Process Parameters

Treatment 1—Hydrophilicity
Precursor material
   polydimethylsiloxane hydroxycut (PMDSO Hydroxycut)
   alt: copolymer (Dimethylesiloxane and/or with blend of dimethylesilane)
Laser

| Frequency | 250 Hz |
|---|---|
| Power | 380 mJ |

Plasma

| Carrier Gas | Argon . . . 80% | |
|---|---|---|
| Reactive Gas | O2 . . . 20% | |
| Flow rate | 15 liter/min | Pressure: slightly above 1 bar |
| Power | 2 KW | |

Treatment 2—Dyeability
Precursor
   Either no precursor or other precursor catalysts
Laser

| Frequency | 250 Hz |
|---|---|
| Power | 380 mJ |

Plasma

| Carrier Gas | Argon . . . 80% | |
|---|---|---|
| Reactive Gas | O2 or N2 . . . 20% | |
| Flow rate | 15 liter/min | Pressure: slightly above 1 bar |
| Power | 2 KW | |

Treatment 3—Hydrophobicity
   Precursor octamethylcyclotetrasiloxane/polydimethylsilane blend (water soluble, hydrogen methyl polysiloxane mixed with polydimethylsiloxane with polyglycolether (water soluble) or combination of the above with polydimethylsiloxane. Using water soluble blends allows for diluting the materials with de-ionised water to the required concentrations based on the application, cost effectiveness and output performance results. Water soluble blends may be produced with relevant additives—these are essentially methods for mixing oil with water to produce emulsions, generally described by the size of the emulsion dispersant, i.e. macro or micro (macro is >100 microns, micro<30 microns).
   alt: copolymer (Dimethylesiloxane and/or with blend of dimethylesilane)
Laser

| Frequency | at least 350 Hz |
|---|---|
| Power | at least 450 mJ |

Plasma

| Carrier Gas | Nitrogen, Argon, Helium . . . 80% | |
|---|---|---|
| Reactive Gas | CO2 or N2 . . . 2-20% | |
| Flow rate | 10-40 liter/min | Pressure: slightly above 1 bar |
| Power | 0.5-1 KW | |

Treatment 4—Fire retardancy
Precursor
   Copolymers and Terpolymers based on siloxane/silane and polyborosiloxane with key inorganic compounds, essentially transition oxides of titanium, silicon and zirconium and boron. Also included, Boron containing siloxane Copolymers and Terpolymers, such as organosilicon/oxyethyl modified polyborosiloxane. Some limited material composition based recent new phosphorous blends may be used, based on the substrate material types and output requirements. octamethylcyclotetrasiloxane/polydimethylsilane blend (water soluble) mixed with polydimethylsiloxane with polyglycolether (water soluble) or combination of the above with polydimethylsiloxane with additives of:
   calcium metaborbate additive to silane/siloxane
   Silicon oxide additive to silane/siloxane
   Titanium isopropoxide additive
   Titanium dioxide (routile)
   Ammonium phosphate
   Aluminum oxide
   Zinc borate
   Boron phosphate containing preceramic oligomores
   Aerogels and hydrogels, low or high density cross linked polyacrylates
   nano/micro encapsulated compositions
   Example: dimethylsiloxane and/or with dimethylsilane with polyborosiloxane, with added transition oxides, range 5 to 10% volume of oxides such as Tio2, sio2 (fumed, gel or amorphous), Al2O3, etc. The precursor materials set forth herein may enhance fire retardency of materials in the system described herein utilizing a hybrid plasma (e.g., with laser). It is within the scope of the invention that the precursor materials set forth herein may enhance fire retardency (or other properties) of materials in a material treatment system utilizing a non-hybrid plasma (e.g., without the laser).
Laser

| Frequency | at least 350 Hz |
|---|---|
| Power | at least 450 mJ |

Plasma

| Carrier Gas | Nitrogen, Argon, Helium . . . 80% | |
|---|---|---|
| Reactive Gas | CO2 or N2 . . . 2-20% | |
| Flow rate | 10-20 liter/min | Pressure: slightly above 1 bar |
| Power | 0.5-1 KW | |

Treatment 5—Anti Microbial

Precursor
    siloxane/silane blends as per hydrophobicity platform, with the addition of octadecyldimethyl (3triethoxysilpropyl) ammonium chloride. octamethylcyclotetrasiloxane/polydimethylsilane blend (water soluble) mixed with polydimethylsiloxane with polyglycolether (water soluble) or combination of above with polydimethylsiloxane with additives of:
    octadecyldimethyl(3-trimethoxysilylpropyl)ammonium chloride),
    Chitosan Laser

| Frequency | at least 350 Hz |
|---|---|
| Power | at least 450 mJ |

Plasma

| Carrier Gas | Nitrogen, Argon, Helium . . . 80% | |
|---|---|---|
| Reactive Gas | CO2 or N2 . . . 2-20% | |
| Flow rate | 10-20 liter/min | Pressure: slightly above 1 bar |
| Power | 0.5-1 KW | |

Some Additional Embodiments and Enhancements

Some additional embodiments, variations of the techniques and applications for the "MLSE" (Multiplexed Laser Surface Enhancement) system described hereinabove will now be described, some of which have may have been discussed only briefly.

Processing Non-Rolled Fabrics

The system described above shows treating fabrics running roll-to-roll. The techniques disclosed herein may also be used for "yard goods", including polymeric and composite films. As mentioned above, rigid materials such as flat sheets of glass (such as for touch screens) may be treated by the techniques disclosed herein. Three-dimensional (3D) components may also be treated with the system.

The system may be modified to run non-rolled fabrics, such as pieces of fabric that are not rolled, but supplied loose, allowing "short run" fabrics such as expensive or high performance materials (including materials inherently not well-suited to roll format). As described in greater detail hereinbelow, these pieces of fabric (substrates being treated) may be disposed on a carrier membrane, as described below.

Figure 5:
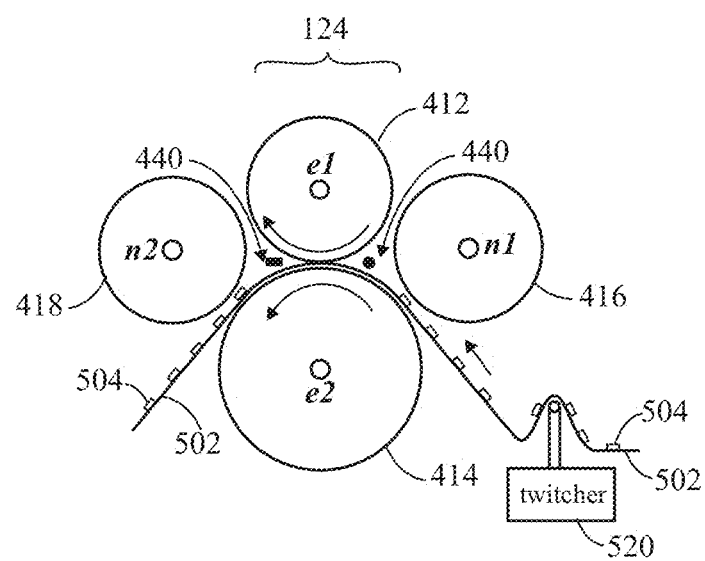
FIG. 5 shows a treatment system for fabric substrates supported by a carrier membrane, with a "twitcher" system at the infeed (input to the system).

FIG. 5 illustrates a MLSE system 500 using (by way of example) a configuration such as in FIG. 4B where the left and right rollers 416 and 418 are moved slightly outward from the (nip) rollers 412 and 414, thereby opening up the cavity 440 to allow for thicker and/or stiffer substrates to be processed through the system. The material being treated, in this case a plurality of exemplary fabric substrate pieces 504 on a continuous carrier membrane 502 may be driven through the reaction zone (energy milieu) of the system by the outside feeding and take up rollers 416 and 418 ("n1" and "n2"). The fabric pieces 504 on the carrier membrane 502 may be stretched and tensioned prior to passing through the MLSE process such as by first feeding the carrier/substrates through a traditional "twitcher" system 520.

Processing Loose Fibers, Fragile Membranes, Individual Fibers

Figure 5A:
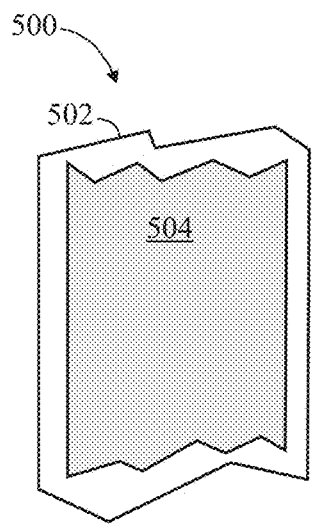
FIGS. 5A, 5B are diagrammatic plan views of fabric substrate pieces supported on a carrier membrane for transport through the treatment system.

FIG. 5A shows that substrates 500 comprising fragile and loose structures and membrane substrates (such as carded wool) 504 can be processed (transported for treatment) through the MLSE system using a backing membrane (carrier) 502 of natural or manmade fabrics to support the loose structure(s) 504 which may be held in place on the backing membrane 502 by (i) the natural affinity of two materials (502, 504), or (ii) electrical discharge fixing or (iii) suitable bonding media (tacky or temporary adhesive).

Figure 5B:
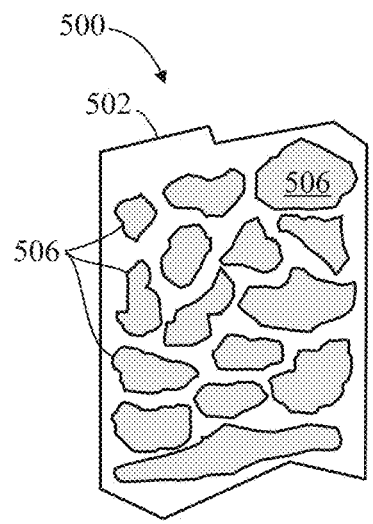

FIG. 5B shows that loose fibers (structures) 506, such as individual fibers or clumps of individual fibers (e.g. raw wool) can be processed through the MLSE system using a backing membrane (carrier) 502 of natural or manmade fabrics to support the loose structure(s) 506 which may be held in place on the backing membrane 502 by (i) the natural affinity of two materials (502, 504), or (ii) electrical discharge fixing or (iii) suitable bonding media (tacky or temporary adhesive).

Figure 5C:
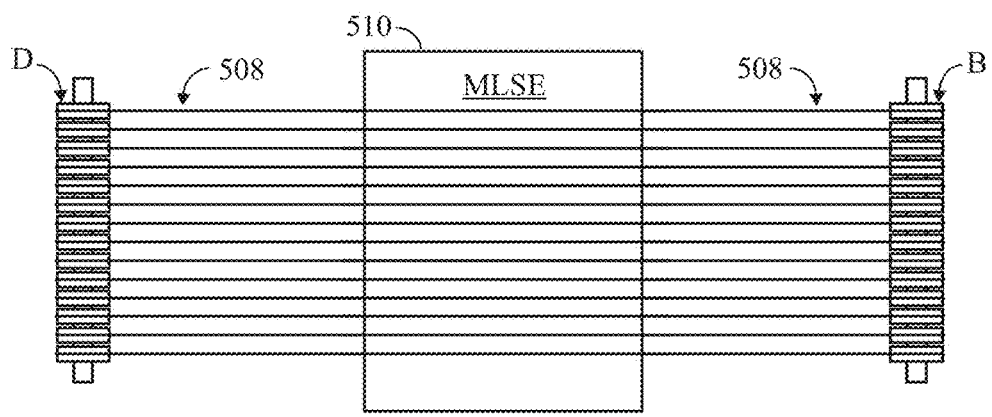
FIG. 5C is a diagram of a treatment system for strands of material.

FIG. 5C shows that the MLSE process can be adapted to process individual or multiple strands 508 of fibers or yarns. The equipment may run either (i) reel-to-reel, with the MLSE process chamber 510 treating single or multiple strands; or (ii) may use pre-prepared single rolls (bobbins) B of multiple strands which are wound off and onto individual drums D. Grooved guide rollers (not shown) may be to guide the strands through the system. individual bobbins or drums. As the strands of individual fibers are passing through the system, the MLSE process parameters may be maintained constant, or may be varied.

Precursor Application

Precursors or accelerants converted during the MLSE process can be pre-applied to the carrier or fabric material, and presented to the MLSE system either wet or dry. This process may be referred to as "doping". These precursors or accelerants may be applied to the carrier or fabric material as either (i) a spray, (ii) through roller deposition, (iii) through electrostatic discharge or (iv) a bath through which the carrier or fabric material is passed. Carrier or fabric material being treated can be soaked, then allowed to dry (partially or completely), then passed through the MLSE system. This may be applicable to loose fibers, fragile membranes, individual fibers.

The precursor or accelerants ("dopants") may be in the form of suspensions or solutions (for example sol-gel materials). For example octamethylcyclotetrasiloxane/polydimethylsilane blend (water soluble) and/or other silane or siloxane family of materials with additives of calcium metaborate and/or boron solutions, silicon oxide and titanium iospropoxide applied to fabrics and dried prior to MLSE treatment to effect fire retardancy. Other suitable precursors may be used to provide functionalities such as hydrophilicity, hydrophobicilty or antimicrobial protection.

Combining or evaporating mixtures of precursors in the environmental and reaction gases directly into the plasma enables in situ synthesis for the desired treatment functionality. This allows for dry treatment of the substrate material (such a fabric), without preparing the fabric.

Doped Carrier Membrane

Where loose fibers or fragile substrates are being processed, the carrier membrane may be doped with a precursor or accelerant. During the treatment process, the carrier may lose only a portion (such as 10%) of its doping, and can thus be reused a number of times before re-doping the carrier. Carriers with different dopants can be prepared in advance (and "off line"), and brought into service on an as-needed basis.

The elements within the precursor may react directly with the treated substrate or may react in the process chamber with the other environmental elements to effect the chemical and material synthesis at the surface of the substrate material.

Figure 6A:
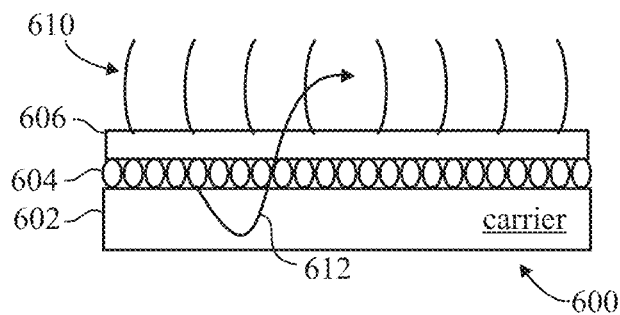
FIGS. 6A, 6B, 6C are diagrams of treatment regimes for fabric substrates on doped carrier membranes.

Three treatment examples are now discussed, with respect to FIG. 6A, B, C. In each example, precursor material ("dopant") 604 is resident on (has previously been applied to) the carrier membrane 602 (compare 502) which is supporting pieces of fabric substrate 606 (such as fabric material 504, 506) as they are transported through the process milieu, such as an atmospheric plasma 610 created in a treatment region (process chamber, reaction chamber, compare 120). The substrate pieces 606 on the doped carrier 602 may together be considered to be an overall substrate 600 that may be fed through the treatment region (124).

Figure 6B:
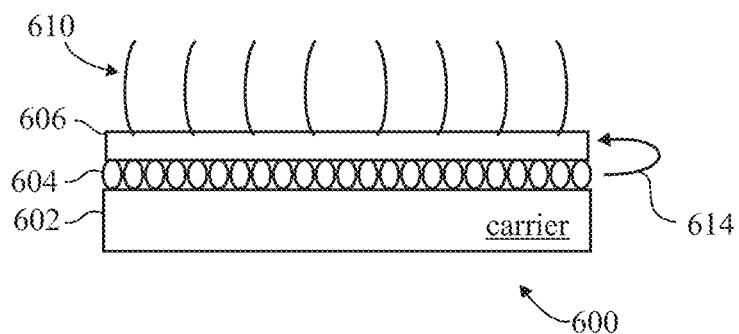
Figure 6C:
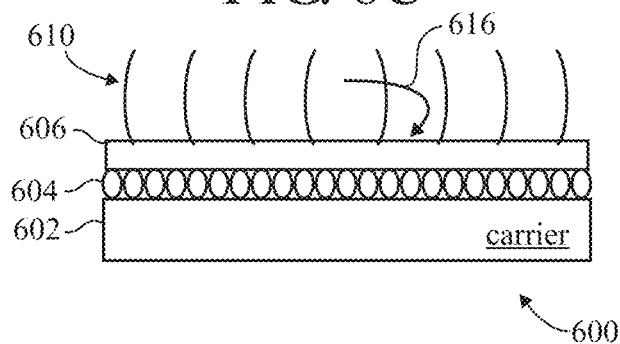

In FIG. 6A, the line 612 indicates that precursor (or accelerant) elements 604 may react in the process chamber (treatment region) 610 to become incorporated with (into or onto) the substrate 606. In FIG. 6B, the line 614 indicates that precursor elements 604 may react directly with the substrate 606. In FIG. 6C, the line 616 indicates that process chamber elements (gases, chemistry in the plasma, as discussed above) may react directly with the substrate 606. In each example, different process parameters may be employed to selectively achieve the desired results, and different sequences and combinations of the results may also readily be obtained (different sequences and combinations of the process parameters may be employed on a given substrate being treated).

Electrostatic Deposition

Electrostatic deposition may be used to dope fabrics or yard goods materials before they enter the MLSE process chamber. For example oxide powders, natural or synthetic fibers may be applied to the surface of the substrate material. For example, oriented fibers or pre-doped fibers may be applied to the substrate surface. This process (not shown) may proceed in a manner similar to conventional "flocking" (the process of depositing many small fiber particles, called "flock", onto a surface) wherein the "flock" is given a negative charge whilst the substrate is earthed (grounded).

Topographical Changes

The MLSE process can be used to change the topographical structure of individual fibers or fibers or yarns within a woven or knitted fabric. These changes may affect/modify the physical properties of the fibers, including but not limited to strength, wear resistance, surface area etc. Generally, these topographical changes may be done independently of the aforementioned chemical changes (such as with precursor material), but can certainly be done in conjunction with those other surface treatment regimes.

The "topographical" changes to the substrate, which may also be considered to be "surface treatments", may include, but are not limited to:

Re-melting or selective ablation may be used to smooth out surface imperfections from extrusion or forming processes Inducing controlled surface roughness to increase friction of the surface Unique structures, topography or texture can be created on the surface of the fiber, reconfiguring the substrate to produce such structures as nano brushes created on the surface of a polypropylene fiber. The topographically modified structures and fibers may be less smooth, may exhibit linear structures, and may have increased surface area which may be useful (for example) in filters such as for trapping microbes. A variety of applications for topographically modified fabrics, treated by the techniques disclosed herein, are possible. See, e.g., FIG. 7D.

Application and Creation of Metal and Ceramic Oxides

Using solgel materials in a range of formats, treatments with a range of compositions such as metal or ceramic oxides are produced on or in the surface of the fiber substrate, either in individual fibers or fibers in a woven or knitted fabric. This also includes the use of rare earths to create "smart" functionality such as supermagnetism, electrical conductivity, sensing capabilities, etc. For example, titanium oxide may be created in the surface of polyethylene fibers using the MLSE system for self cleaning and antibacterial and durability properties.

Multifunctionality

The MLSE System can be used to create multifunctionality within a monolithic fiber, yarn, knitted fabric, woven fabric, non woven materials or yard material. Some examples are:

(Different Treatments on Different Sides) The process parameters of the MLSE system can be altered to affect the depth of processing. The characteristic changes effected can be controlled to be either throughout the fabric structure or to a controlled depth. Thus, processing the fabric on two passes, with alternate (different) process parameters on either side allows components to be produced that have different properties on both sides. For example, non-woven materials may be produced that exhibit hydrophobicity on one face and hydrophilicity on the other, for use in applications such as incontinence wear, engineering filters and medical bandages.

(Single Precursor, multiple processing) A single precursor applied to the substrate can be treated (processed) multiple times to effect different performance characteristics. This may be achieved by passing the material being treated multiple (several) times through the energy milieu (treatment region) with different MLSE process settings or by using multiple energy sources simultaneously which react with different elements within the substrate material.

(Multiple Pass treatments) Multifunctionality can be achieved by running the substrate through the MLSE process multiple times, each time using different precursors or different process parameters. At each pass the reactions effected may be substantially solely dependant on the new substrate applied or may be a composite reaction of the new precursor with the chemistries effected at previous processing passes.

Laser Configuration

As discussed above, the laser beam may be shaped to provide a rectangular beam of consistent power density across the entire treatment area. Some further variations and enhancements are now discussed.

(Laser Beam shaping) For specific applications and process milieu, the process can be seen to work with different shaped beams, including but not limited to round, oval or thin line profiles. Further, the option to provide a laser grating of different powers or intensities working in unison across the treatment area may provide different process results.

(Multiple laser beam sources) The MLSE process can be configured with a device to provide the laser energy into the process through an overlapping series (array)

of small, individual beams acting perpendicular to either the material or the process chamber. This array can be created by either a series of individual fiber lasers or a single beam with beam-splitting and a mirror arrangement. The array may be incorporated into a fixed bank interacting with a block or plate plasma, or can be incorporated into an assembly in which a fixed roller replaces one of the nip rollers in the cylindrical electrode (e1, e2) configurations such as shown above.

(Laser Wavelengths) The MLSE process can achieve different process parameters by using different wavelength lasers, such as 172 nanometers to 10.6 microns, which will include the use of different types of laser sources or lasers with tunable wavelengths e.g. CO2, NdYag, Diode or Fiber lasers.

Figure 7A:
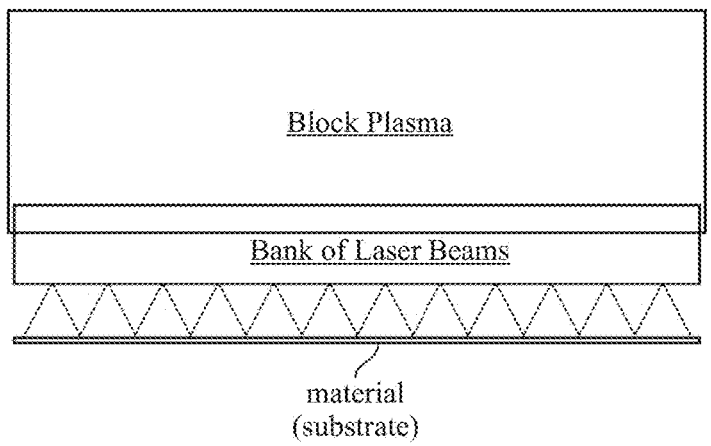
FIGS. 7A, 7B, 7C are diagrams of an embodiment of an MLSE system.
Figure 7B:
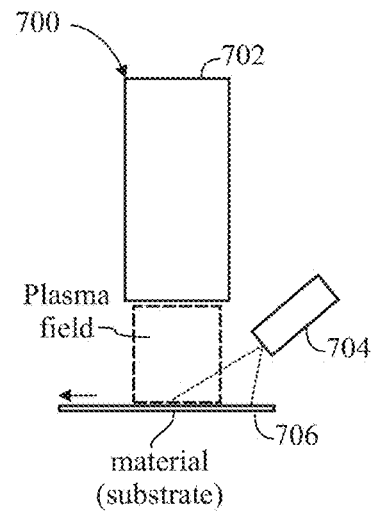

FIGS. 7A, 7B show a system 700 comprising a block plasma generator 702, a bank (such as a plurality of laser beams 704 beams impinging on the plasma 706 and the material (substrate) 710 being treated. Multiple lasers may be used to generate the multiple beams, some individual lasers may be used to generate several of the beams.

Figure 7C:
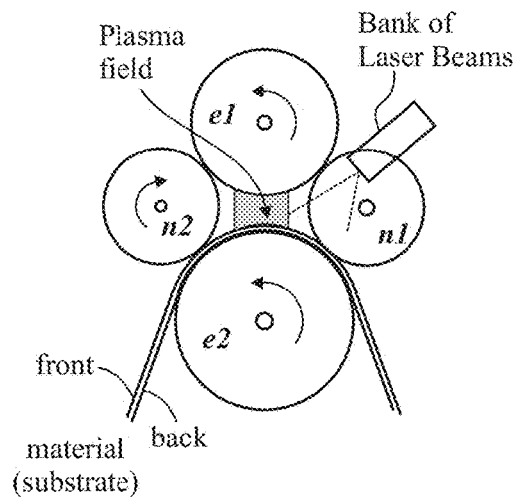
Figure 7D:
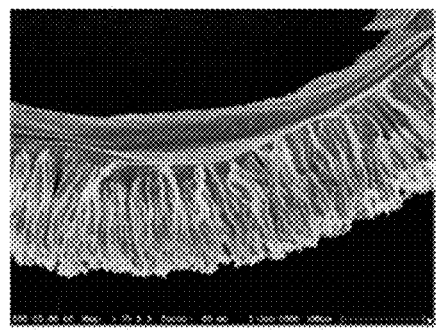
FIG. 7D is a (micro) photograph of a substrate material treated to exhibit fibers, created by the treatment process, extending from a surface thereof.

FIG. 7C (compare FIG. 4A) shows a material substrate passing through roller electrodes e1, e2), with a bank of lasers generating beams impinging on the plasma and the material (substrate) being treated. These techniques are suitable for simple material substrates, or pieces of fabric substrate on carrier membranes, as discussed above (FIGS. 5A, 5B).

Microencapsulation

Microencapsulation is the technology whereby chemical compounds are locked into microcapsules, whereby the capsule structure is designed to degrade under certain environmental conditions to release the stored chemical compounds. The chemical compounds can be such things as drugs and medications or dye colorants. The method of degradation may be time, heat, reaction with certain chemistries or electrical discharge. The microcapsules may be bonded to a fabric structure. The current technology uses a heat setting process in water over extended times to affix the microcapsules to the fabric weave. Thus, the capsule structure needs to be resilient enough to withstand the affixing method.

The MLSE system disclosed herein can be used to created covalent bonding of microcapsules to a substrate surface dry, either using the environmental gases or other suitable precursors, substantially instantaneously, with minimal heat dispersed into the capsule structures. This may allow for a new generation of super-sensitive microencapsulation technologies.

Atomic Layer Deposition

The process parameters of the MLSE system can be modified to produce a membrane structure over the substrate which is an atomic layer deposition. For example carbon or silicon based structures.

Additional Comments and Features

In some of the embodiments disclosed herein—such as shown in FIGS. 2A, 4A, 4B, 4C, 4D, 4F—the substrate (material or fabric) extends between the electrodes One or both of the electrodes (e1, e2) which are rotating to pull the fabric through the system. The electrodes therefore serve the dual purposes of creating the plasma and moving the material through the system. The substrate being treated may be fed continuously through the treatment region (124). The electrodes (e1, e2) may be elongated, having a length sufficient to extend across the entire width of a web of fabric (such as at least one meter in width), and cylindrical (having an axis of rotation).

The fabric or substrate may be situated between the rotating anode and cathode pair (electrodes e1, e2) while actually in contact with one or both of the electrodes. Current passing between the electrodes (e1, e2) may pass through the fabric.

The substrate material may be disposed between and in contact with a pair of electrodes One or both of the electrodes (e1, e2) may be in the form of rollers. At least one of these roller electrodes may be driven (rotated, such as by an external motive source). On of the roller electrodes may be "passive", and rotate in response to the substrate material passing over its external surface (in the manner of an idler pulley).

One or both of the electrodes (e1, e2) may not rotate at all. For example, in the embodiment of FIG. 4A, the electrode e2 may rotate (the nip rollers n1 and n2 may also rotate), and the electrode e1 could be non-rotating, in which case its cross-section may be altered to more effectively contain or improve the plasma reaction with the substrate. Other combinations are possible such as (i) which one(s) of the elements (rollers) e1, e2, n1, n2 are driven to move material through the treatment region (ii) which one(s) are passive, and (iii) which (if any) are not in the form of rollers at all. For example, a non-rotating electrode may be in the form or a bar, or an elongated brush, or curtain.

The system disclosed herein may use products of substrate ablation by laser to contribute to the reaction milieu, where they mix and are subsequently and nearly instantaneously reconstituted and synthesized on and/or into the substrate.

FIG. 1 shows that a laser beam 132 enters the treatment region 124 approximately along the y-axis, directed approximately parallel to and between the electrodes e1 and e2, from one end thereof, and slightly above the top surface 102a of the substrate 102, so as to interact with the plasma (plume) generated by and between the two electrodes e1 and e2. As shown in FIG. 1, a mirror, which may be a retro-reflector "RR", may be disposed at the other end of the electrodes e1 and e2, on the opposite side of the treatment region 124, to reflect the beam back into and more fully couple the beam power into the plasma, which might be otherwise dissipated (assuming the beam is not completely diffused or absorbed into the substrate by angling the beam towards the substrate as shown in FIG. 2).

FIG. 2 shows the electrodes 212 and 214 rotating (curved arrows) which may move the material being treated through the treatment region, 124 with both electrodes on one side of the substrate 102. (Both electrodes rotate in the same direction in this configuration.) FIG. 2A shows the electrodes 212 and 214 disposed on opposite sides 102 and 102b of the substrate 102, and rotating in opposite directions to feed (advance) the material 102 through the treatment region 124. FIG. 4A shows the electrodes 412 and 414 rotating in opposite directions as the material 402 is fed therethrough. The nip rollers 416 and 418 may rotate in directions opposite from that of the electrode 414. FIG. 4B may be similar to FIG. 4A, with respect to rotations of the electrodes and nip rollers. FIGS. 4C and 4D also show the electrodes 412 and 414 disposed on opposite sides of the material 402 being treated and rotating in opposite directions to feed (more, advance) the material through the treatment region. See also FIG. 4F, FIG. 5, FIG. 7C. Material being treated may be fed continuously through the system, and the treatment region. In some of the embodiments disclosed herein (such as FIG. 4G), the electrodes may be flat sheet, plate electrodes 452 and 454, rather than rollers, but some of the teachings disclosed in such embodiment(s) may be applied to the roller-electrode-based embodiments.

FIG. 4C shows a shield 420 deposed around the electrode 412, and partially onto the electrode 414 to contain the composite plasma in the treatment region. The shield 420 may be provided with a parabolic mirrored surface on the inside disposed around the first and second rollers to define the cavity, reflecting concentrated energy from the hybrid plasma to the treatment area.

Effluents of the process may be exhausted by creating negative pressure or a partial vacuum on the side opposite the hybrid laser/material (fabric) interface, acting to draw the reactive plasma energy through the textile undergoing treatment.

A plasma producing gas may be premixed or mixed upstream of the plasma gas feeding the active plasma with reactive constituents blended for various treatments to be diffused into the substrate with simultaneous surface activation by plasma reaction. These may include any of the treatments listed above, such as for hydrophilicity, water or liquid absorption, hydrophobicity, water repellency, stain resistance, oleophobicity, oil resistance, hydrocarbon repellency, fuel resistance (does not absorb fuel), fire retardancy, anti-microbial and anti-bacterial properties, and others.

Materials, such as wool, containing carbon can be treated, converting some of the carbon to diamond-like carbon (DLC), such as amorphic DLC, to alter its properties. See, for example, U.S. Pat. No. 5,554,415.

The MLSE process disclosed herein can be used to change the topographical structure of individual fibers or fibers or yarns within a woven or knitted fabric. These changes may affect the physical properties of the fibers, including but not limited to strength, wear resistance, surface area etc. The changes at the surface include, but are not limited to:

- Remelting or smoothing out surface imperfections from extrusion or forming processes
- Inducing controlled surface roughness to increase friction of the surface
- Creating unique structures on the surface of the fiber, reconfiguring the substrate to produce such structures as nano brushes created on the surface of a polypropylene fiber. See FIG. 7D For example, a polypropylene substrate can be treated so that a significant portion (such as approximately 60%) of its surface is converted to fibers extending from a surface thereof. (like bristles on a brush), without altering the composition of the original substrate material.

It is thus evident that the techniques disclosed herein may be used to alter both the surface chemistry and topology of materials being treated. This is enabled by the hybrid plasma, with laser (such as pulsed), multiple energy sources being brought together in the presence of environmental gases and precursors to effect structural and chemical change in the surface of the substrate. The process can synthesize a wide variety of materials on and in the surface of the substrate.

A remarkable feature of the processes disclosed herein is that the substrate material being treated may remain substantially at room temperature, for example, at approximately 30° C., such as no greater than 40° C. Avoiding elevating the temperature of the substrate material being treated may be very important for materials such as silk (protein) and other natural and synthetic fibers which are temperature-sensitive.

The rollers (including electrodes which are rollers) themselves may heat up during the process, and may therefore be provided with coolant flowing therethrough to lower their temperatures. Cooling may also aid in preventing of cracking of ceramic coatings on the electrodes.

In other processes, the substrate temperature may be significantly elevated. Consider, for example, US 20100320176 (Mohanty, referenced hereinabove), wherein:

Mohanty discloses method and apparatus for forming layers (i.e. metallic, ceramic) on a target—the particle laden plasma deposits repeated layers Mohanty's laser is adjacent to the plasma jet. In some of the embodiments disclosed herein, the laser may be directed substantially parallel to the axes of and between the rotating electrodes to interact with the plasma in the treatment area (region).

Mohanty's electrodes do not rotate. In some of the embodiments disclosed herein, the electrodes rotate.

Mohanty's plasma and laser operate nearly simultaneously, while the laser and plasma disclosed herein may operate simultaneously, in substantially the same space (in the treatment region) at substantially the same time.

Mohanty's laser acts to remelt and densify previously (plasma) deposited layers. This may not occur in the processes disclosed herein Mohanty's system is a "hybrid apparatus", not a hybrid plasma such as disclosed herein.

Mohanty uses a jet vs. the corona discharge disclosed herein.

Mohanty does not show or describe simultaneous or hybrid interaction of laser and plasma. FIGS. 6 B&C of Mohanty are merely depictions of beam modes.

Mohanty's electrodes are concentric. The electrodes disclosed herein (in many embodiments) are not concentric, but rather are parallel to one another, juxtaposed and rotating.

Mohanty entrains materials (powder/liquid) into the plasma. The techniques disclosed herein may spray pre- or post-treatment materials onto the substrate, not into the plasma Mohanty's system is for serial (start, stop, start, stop) production of discrete components. The techniques disclosed herein provide for continuous processing of web type substrates feeding through (such as between) the roller electrodes.

Mohanty is directed to treating metallic components. The techniques disclosed herein are well-suited to treating textiles, including very temperature-sensitive materials, without damaging the material.

While the invention(s) has been described with respect to a limited number of embodiments, these should not be construed as limitations on the scope of the invention(s), but rather as examples of some of the embodiments. Those skilled in the art may envision other possible variations, modifications, and implementations that are should also be considered to be within the scope of the invention(s), based on the disclosure(s) set forth herein, and as may be claimed.

What is claimed is:

1. A method of treating a material comprising:
providing two elongated electrodes (e1/e2) disposed generally parallel with one another with a gap therebetween, at least one of which comprises a roller;
with the electrodes, generating an atmospheric pressure plasma in a treatment region;
directing at least one laser beam into the treatment region, approximately parallel to and between the electrodes, to interact with the plasma, resulting in a hybrid plasma;
rotating the at least one of the rollers to advance the material through the gap between the rollers in the treatment region.

2. The method of claim 1, wherein:
during treating the material, the material remains substantially at room temperature.

3. The method of claim 1, further comprising:
feeding the material being treated to the process chamber through a twitcher system.

4. The method of claim 1, wherein the material being treated comprises a material selected from the group consisting of strands of fibers, yarns, wool, and pieces of fabric disposed on a carrier membrane.

5. The method of claim 1, further comprising
changing the topographical structure of materials which comprise individual fibers or fibers or yarns within a woven or knitted fabric.

6. The method of claim 1, further comprising
performing different treatments on each side of a material being treated.

7. The method of claim 1, further comprising at least one of:
passing the material being treated several times through the treatment region;
using multiple energy sources simultaneously which react with different elements within the material; and
passing the material being treated several times through the treatment region, at least some of the times using different precursors or different process parameters.

8. The method of claim 1, further comprising:
using a bank of laser beams impinging on the plasma.

9. The method of claim 1, further comprising:
combining or evaporating mixtures of precursors in the plasma, thereby enabling in situ synthesis for a desired treatment functionality.

10. The method of claim 1, wherein the treatment region is in a process chamber, and further comprising:
prior to feeding the material through the process chamber, applying precursors or accelerants to the material or to a carrier membrane for the material as either (i) a spray, (ii) through roller deposition, (iii) through electrostatic discharge or (iv) a bath through which the material is passed.

11. The method of claim 10, comprising one or more of the following treatments:
reacting the precursors or accelerants in the treatment region, to become incorporated with the material;
reacting the precursors or accelerants directly with the material;
reacting gases and chemistry in the plasma with the material; and
extracting gases and materials from the substrate by means of ablation and reacting said gases and materials to become incorporated with the substrate material.

12. The method of claim 1, further comprising:
using electrostatic deposition to dope fabrics or yard goods materials with dopants before they enter the treatment region:
wherein the dopants comprise oxide powders or natural or synthetic fibers applied to a surface of the material.

13. The method of claim 12, further comprising:
applying oriented fibers or pre-doped fibers to the surface of the material.

14. The method of claim 1, further comprising
electrostatically biasing the material.

15. The method of claim 1, further comprising:
controlling the process so that the treatment extends at least partially through the material, in a controlled manner.

16. The method of claim 1, further comprising:
treating both sides of the material, with different process parameters on each side.

17. The method of claim 1, further comprising:
treating one face of the material to exhibit hydrophobicity; and
treating an other face of the material to have hydrophilicity.

18. The method of claim 1, further comprising:
providing a carrier membrane;
further comprising:
disposing pieces of the material being treated on the carrier membrane.

19. The method of claim 1, wherein:
the laser beam impinges on the material being treated.

20. Apparatus for treating materials comprising:
two spaced-apart elongated electrodes (e1/e2) disposed generally parallel with one another, with a gap therebetween, for generating a plasma in a treatment region between the electrodes, at least one of which electrodes comprises a roller; and
one or more lasers for directing corresponding one or more beams into the treatment region, approximately parallel to and between the electrodes, to interact with at least one of the plasma and the material being treated.

21. Apparatus, according to claim 20, wherein at least one of the one or more beams are directed into the treatment region from one end of the electrodes, and further comprising:
a retro-reflector disposed at the other end of the electrodes.

22. Apparatus, according to claim 20, further comprising:
additional rollers disposed adjacent the electrode rollers for forming a semi-airtight cavity between the outer surfaces electrode rollers and the additional rollers, for defining the treatment region and for containing the plasma.

23. Apparatus, according to claim 20, further comprising:
a shield disposed at least partially around at least one of the electrode rollers, wherein at least a portion of the shield comprises a mirrored surface.

24. Apparatus, according to claim 20, further comprising at least one of:
first nozzles for delivering precursor material, in liquid, solid or atomized form; and
second nozzles for dispensing finishing material onto the material being treated.

25. Method of treating a material comprising:
creating an atmospheric pressure plasma in a treatment region with two elongated electrodes (e1/e2) disposed generally parallel with one another with a gap therebetween, at least one of which comprises a roller;
directing a laser beam into the treatment region, approximately parallel to and between the electrodes, substantially simultaneously with creating the plasma, resulting in a hybrid plasma in a reaction milieu;
passing a material through the treatment region, causing it to be treated; and
using products of substrate ablation by the laser beam to contribute to the reaction milieu, where they mix and are subsequently and nearly instantaneously reconstituted and synthesized on and/or into the substrate.

* * * * *